United States Patent [19]
Hildebrandt et al.

[11] 3,837,130
[45] Sept. 24, 1974

[54] WINDOW MOUNTING ARRANGEMENT

[75] Inventors: Christian Hildebrandt, Wilsche; Karl Erck, Wolfsburg, both of Germany

[73] Assignee: Volkswagenwerk Aktiengesellschaft, Walfsburg, Germany

[22] Filed: June 13, 1973

[21] Appl. No.: 369,491

[30] Foreign Application Priority Data
June 14, 1972 Germany.......................... 2228870

[52] U.S. Cl....................... 52/400, 52/208, 52/403
[51] Int. Cl.............................................. E06b 3/62
[58] Field of Search ............. 52/208, 398, 400, 403; 296/93

[56] References Cited
UNITED STATES PATENTS

| | | | |
|---|---|---|---|
| 3,338,015 | 8/1967 | Hoverman, Jr. | 52/400 |
| 3,462,903 | 8/1969 | Kronbetter | 52/400 |
| 3,728,832 | 4/1973 | Erck | 52/403 X |

FOREIGN PATENTS OR APPLICATIONS

| 524,937 | 5/1956 | Canada | 52/400 |
|---|---|---|---|

*Primary Examiner*—Alfred C. Perham
*Attorney, Agent, or Firm*—Brumbaugh, Graves, Donohue & Raymond

[57] ABSTRACT

An arrangement for mounting a pane of glass, such as windshield, in an automobile window frame comprises a grooved channel associated with the window frame, an elastic sealing molding, and a wedge. The sealing molding includes a pane-engaging part, located exteriorly on the automobile relative to the channel, and a retaining lip part. At least a portion of the retaining lip part of the sealing molding protrudes into the groove of the channel and lies against the inner surface of one wall of the channel. The portion of the retaining lip part that protrudes into the groove is narrower than the groove. The wedge is inserted into the groove between the retaining lip and the second, opposite wall of the channel to hold the retaining lip in place in the groove.

10 Claims, 4 Drawing Figures

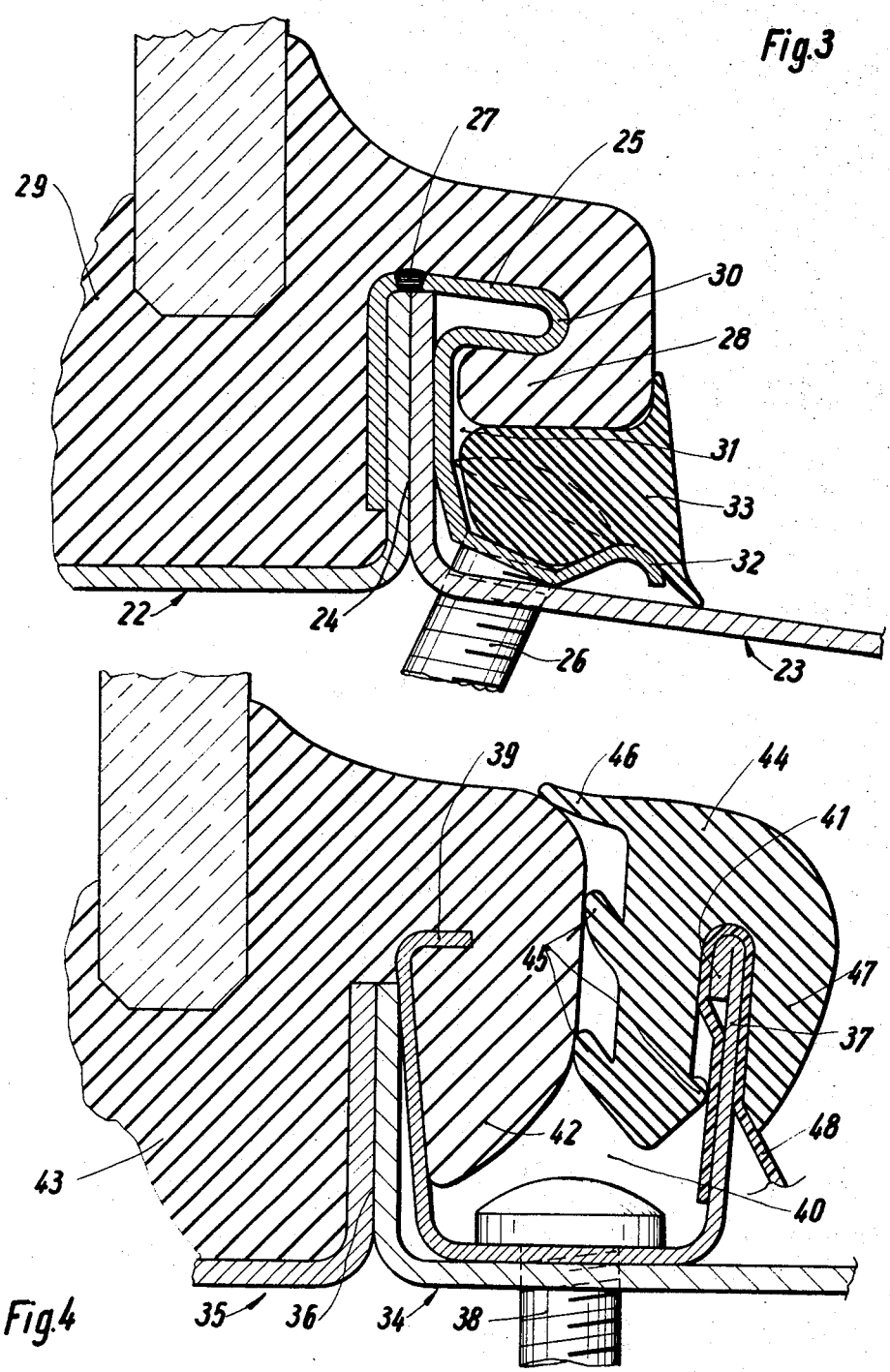

WINDOW MOUNTING ARRANGEMENT

BACKGROUND OF THE INVENTION

In mounting a pane of glass, such as a windshield, in an automobile window frame, it is common to use a sealing molding that engages both the windowpane and the window frame. In one mounting arrangement, the sealing molding extends entirely around the periphery of the windowpane, which is firmly seated, for example by gluing, in the molding. The window frame includes an upstanding peripheral flange which lies generally parallel to the windowpane when the pane is installed in the frame. To install the windowpane in the frame, the pane and the sealing molding are first placed against the exterior of the frame. An elastic retaining lip that extends from the sealing molding is then drawn over the upstanding flange of the frame to engage the flange and thereby hold the windowpane in the frame.

The above-described mounting arrangement has been improved upon, for example, by an arrangement disclosed in published German patent application Ser. No. 1,959,295 (Corresponding to U.S. Pat. application Ser. No. 91,686) now U.S. Pat. No. 3,728,832. In the described mounting arrangement, a spring clip is pressed onto the upstanding window frame flange. The spring clip includes a ridge which points toward the interior of the automobile and which, together with the flange and a portion of the window frame located on the interior side of the flange, forms a grooved channel. The retaining lip of the sealing molding is shaped to fit over the inwardly pointing ridge of the spring clip and lies in the groove of the channel against the flange and the spring clip. Since the ridge of the spring clip is oriented at an angle to the windowpane, the retaining lip holds the windowpane more securely in the window frame than in the mounting arrangement of the preceding paragraph.

Nevertheless, the improved mounting arrangement does not meet many proposed safety standards for automobiles, without additional measures for holding the window in the frame. One particular objection to the mounting arrangement is that, in an extreme case, the force of a passenger being thrown against the interior surface of an automobile window would be sufficient to pull the retaining lip of the sealing molding over the ridge of the spring clip and out of the groove of the channel. The sealing molding and the windowpane would thus be forced from the window frame before the impact of the passenger's body could break the window and thereby relieve the stress on the sealing molding. Such a situation is particularly likely in an automobile equipped with a laminated windshield having a high strength internal plate.

While the sealing molding may be glued to the window frame to seat the molding more securely, a gluing operation involves considerable technical difficulties in production. Moreover, the sealing molding should preferably be easily removed from the window frame to make replacement of the window of the molding more convenient. Replacement occurs frequently in mass production of automobiles when, for example, a previously installed window must be termporarily removed, together with the sealing molding, to permit the automobile body to be repainted. Gluing of the sealing molding in place on the window frame would therefore significantly increase labor costs for mass producing automobiles.

SUMMARY OF THE INVENTION

The present invention overcomes the problems noted above in providing a window mounting arrangement of sufficient resistance to impact loads, without sacrificing ease and convenience of replacement. Basically, the window mounting arrangement of the invention comprises a grooved channel associated with a window frame, an elastic sealing molding, and a wedge. The sealing molding includes a windowpane-engaging part, located exteriorly on the automobile relative to the channel, and a retaining lip part. At least a portion of the retaining lip part protrudes into the groove of the channel and lies against the inner surface of one wall of the channel. The retaining lip part is sized to be narrower than the groove, so that the wedge can be inserted into the groove between the retaining lip part and the opposite channel wall. The wedge thus securely holds the retaining lip of the sealing molding in the channel groove, yet the wedge may be conveniently withdrawn from the groove to permit removal of the sealing molding and the windowpane.

The wedge for the present mounting arrangement is preferably elastic to improve the holding capacity of the mounting arrangement, and may have barb-like protrusions on its surfaces that contact the retaining lip and the wall of the channel to further enhance retension of the wedge in the groove. In one embodiment of the invention, still additional retention strength is provided by inclining the opposite wall of the channel inwardly toward the channel groove to overlap at least partly the wedge when it is inserted in the groove. For improved visual appearance of the mounting arrangement, the outer end of the wedge is preferably even with the adjacent visible surfaces of the sealing molding, when the wedge is inserted in the channel groove.

The channel for the mounting arrangement may take various constructions; e.g., it may be formed directly from the flange of the window frame. In accordance with the invention, however, the channel is advantageously manufactured as a separate member, which is then secured to the window frame, as this construction simplifies production and facilitates remodeling older automobiles. The separate channel member may, for example, be generally U-shaped in cross-section and may be secured to the window frame with its legs either parallel or perpendicular to the windowpane. With a generally parallel orientation of the legs of the channel member and the windowpane, the leg nearer the pane-engaging part of the sealing molding preferably has its end inclined inwardly towards the groove of the channel. The inclined end of the leg thus provides an interiorly pointing ridge over which the retaining lip of the sealing molding is fitted. The wedge for this embodiment suitably has a lip that extends over the outer surface of the channel member leg that is farther from the pane-engaging part of the sealing molding.

BRIEF DESCRIPTION OF THE DRAWINGS

For a better understanding of the invention, reference may be made to the following description of various exemplary embodiments, taken in conjunction with the figures of the accompanying drawings, in which:

FIG. 3 is a sectional view of a third embodiment of a window mounting arrangement according to the invention; and FIG. 4 is a sectional view of a fourth embodiment of a window mounting arrangement according to the invention.

DESCRIPTION OF EMBODIMENTS

Figure 1:
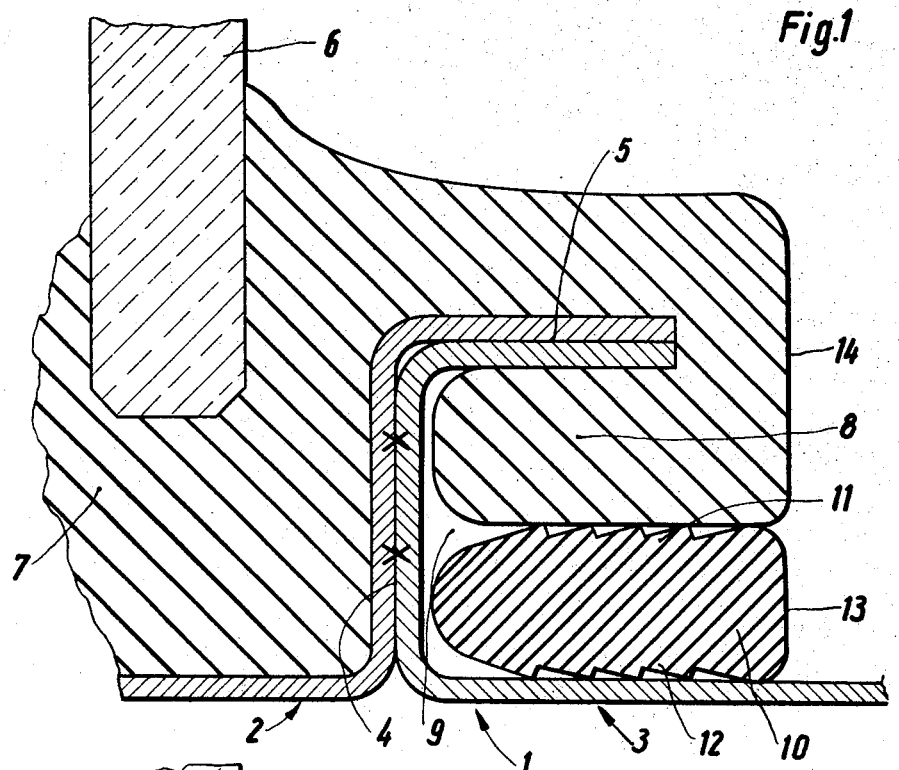
FIG. 1 is a sectional view of a window mounting arrangement according to the invention.

For brevity and clarity of description in connection with the illustrative embodiments depicted in the drawings, the invention is described below with reference to the mounting of the windshield of an automobile. It will be understood, however, that the invention has application as well to the mounting of other glass panes in automobiles and to the mounting of glass panes in vehicles in general.

FIG. 1 depicts, in section, a windshield mounting arrangement in which the window frame, generally designated 1, is formed by two adjacent pieces of sheet metal 2 and 3 that comprise part of the body of an automobile. The adjacent edges of the sheet metal pieces 2 and 3 are bent at right angles to the major portions of both pieces to lie against one another and thereby define an upstanding flange 4. The edges of the pieces of sheet metal 2 and 3 are joined together along the flange 4 by spot welding, for example, as indicated by the X's in FIG. 1 on the flange. The sheet metal edges are bent again at right angles, so that the edge of the sheet metal piece 3 is turned through 180° to lie parallel with the main portion of the sheet metal piece 3. The second bend forms a ridge 5 that points toward the interior of the automobile (i.e., the right hand side of FIG. 1). As can be seen in the drawings, the flange 4, the ridge 5, and the major portion of the sheet-metal piece 3 together form a channel defining a groove 9.

An edge portion of a windshield 6 is received in an elastic sealing molding 7, which lies against the piece of sheet metal 2. When being installed in the window frame 1, the windshield 6 and the sealing molding 7 are placed against the flange 4 from the exterior of the automobile and a retaining lip 8 of the sealing molding 7 is pulled over the ridge 5, defining one wall of the mounting channel, by means of a mounting cord (not shown). Because of its elasticity, the retaining lip 8 lies tightly against the ridge 5 in the groove 9 of the channel.

The portion of the retaining lip 8 that is received in the groove 9 is narrower than the groove. A wedge 10 is inserted into the groove 9 in the space which remains between retaining lip 8 and the major portion of the piece of sheet metal 3. The wedge 10 preferably is made of an elastic material, but, at the same time, the wedge should at least be hard enough so that it cannot be compressed sufficiently to permit the retaining lip 8 to be twisted out of the groove 9. The compressed forces acting on the wedge 10 result from the normal load of its capture between the lip 8 and the sheet 3 and also from special loading, such as the impact of a passenger thrown against the windshield 6 during an accident. Since the windshield 6 is firmly seated in the sealing molding 7, for example, by gluing, the forces acting on the windshield are transferred to the retaining lip 8 and tend to twist the retaining lip out of the groove 9 over the ridge 5. Twisting movement of the retaining lip 8 produces a compression force on the wedge 10, which the wedge must be able to resist in order to hold the retaining lip in the groove.

To increase the effectiveness of the wedge 10, optional saw-tooth protrusions may be provided on its surfaces 11 and 12, which contact the retaining lip 8 and the piece of sheet metal 3, respectively. As can be seen in FIG. 1, when the wedge 10 is inserted into the space between the retaining lip 8 and the piece of sheet metal 3, its exposed end 13 is preferably evenly aligned with the edge 14 of the sealing molding 7 to present a neat and attractive appearance.

Figure 2:
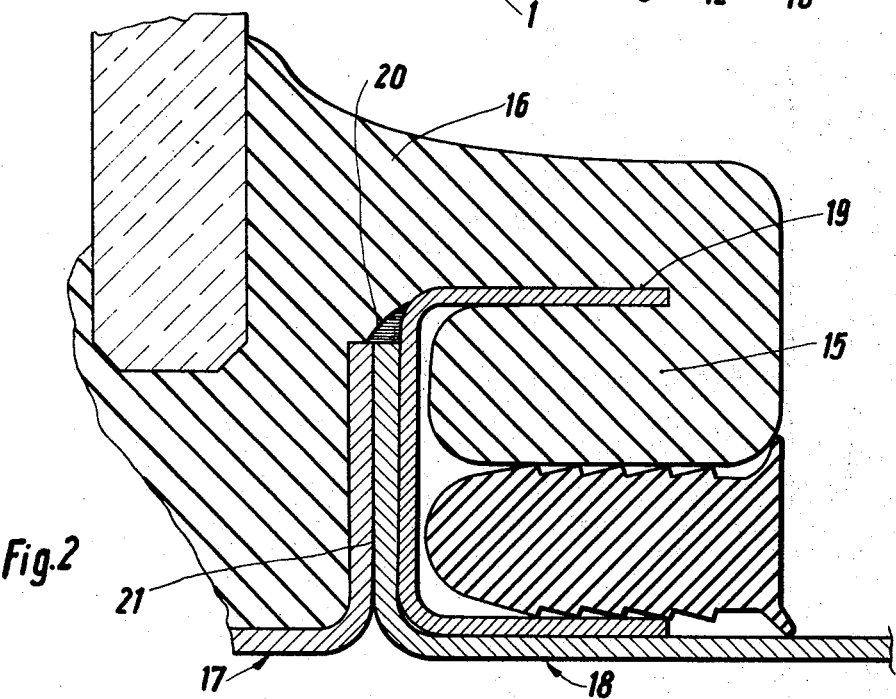
FIG. 2 is a sectional view of a second embodiment of a window mounting arrangement according to the invention.

FIG. 2 illustrates a second embodiment of the invention, wherein the channel is not formed by the sheet metal of the automobile body, as for example pieces 17 and 18, but rather is formed by a separate U-shaped member 19. As in the embodiment of FIG. 1, the adjacent edges of the sheet metal pieces 17 and 18 are bent through 90° to lie against each other and form a flange 21. The channel member 19 is fastened to the flange 21 with its base against the flange, for example by welding as shown by the reference numeral 20 in FIG. 2, whereby the upper leg of the member 19 defines an interiorly pointing ridge corresponding to the member 5 of FIG. 1. To install the windshield and the sealing molding 16 in the window frame of FIG. 2, the retaining lip 15 of the molding is drawn over the upper leg of the channel member 19. A wedge is then inserted into the groove of the channel member 19 between the retaining lip 15 and the lower leg of the channel member.

In the mounting arrangement of FIG. 3, two adjacent pieces of body sheet metal 22 and 23 have their edges bent inwardly to form a flange 24, similar to the flange 21 of FIG. 2. The channel for the mounting arrangement is defined by a clamp 25 which is placed over the end of the upstanding flange 24. The clamp 25 is fastened to the body sheet metal by a bolt 26, which passes through the clamp and the sheet metal piece 23, and/or by welding to the flange 24 along the end thereof, as indicated by the reference numeral 27.

In cross-section, the clamp 25 is shaped so that when installed on the flange 24, it extends parallel and adjacent the edge of the sheet metal piece 22 forming a portion of the flange 24 and then at right angles out over the top of the flange 24. The clamp 25 protrudes toward the interior of the automobile (to the right in FIG. 3) beyond the flange 24 a predetermined distance, after which it is turned back on itself through 180° toward the flange 24 to define a ridge 30. After extending adjacent and parallel to the edge of the sheet metal piece 23 forming a portion of the flange 24, the clamp 25 is again directed, through a series of three short segments, away from the flange 24 to define a groove 31. The end 32 of the clamp 25 is inclined inwardly toward the groove 31 to overlap or overhang the groove.

As in the previously described mounting arrangements, a windshield is received in a sealing molding 29 which includes a retaining lip 28 extending over the ridge 30 of the clamp 25 and into the groove 31. Between the retaining lip 28 and the side of the clamp 25 adjacent the sheet-metal piece 23, a contoured elastic wedge 33 is inserted. The wedge 33 is shaped so that, when inserted into the groove 31, it is partially overlapped by the end 32 of the clamp 25. The resiliency of the wedge 33, and preferably also a spring action provided in the end 32 of the clamp 25, insures that the wedge can be inserted into the groove 31 without difficulty and that it will be securely held in place.

A fourth embodiment of the invention is shown in FIG. 4, in which the edges of sheet-metal pieces 34 and 35 are turned inwardly to form a flange 36, like the flanges 21 and 24 of FIGS. 2 and 3, respectively. A generally U-shaped channel member 37 is secured to the sheet-metal piece 34 adjacent the flange 36 so that one leg of the channel member 37 contacts and is generally parallel to the flange 36. The channel member 37 may be secured to the body sheet metal by a bolt 38, for example, which extends through the bottom of the channel member 37 and through the sheet metal piece 34. The end 39 of the leg of the channel member 37 adjacent the flange 36 (i.e., the left hand leg as shown in FIG. 4) is inclined inwardly generally at right angles to the rest of the leg to extend over the groove 40 formed by the channel member 37. The end 41 of the opposite leg of the channel member 37 is turned inwardly 180° to lie parallel to itself and provide a smooth surface for lip 47 on the wedge 44 as described hereinafter.

A windshield is securely seated in a sealing molding 43, which includes a retaining lip 42. The retaining lip 42 is fitted over the inwardly inclined end 39 of the left hand leg of the channel member 37 and lies in the groove 40. A wedge 44 formed of elastic material is inserted into the groove 40 between the retaining lip 42 and the right hand leg of the channel member 37. Like the wedge 10 of FIG. 1 and the wedge of FIG. 2, the wedge 44 preferably includes protrusions 45 extending from its contact surfaces to increase its holding effectiveness. Adjacent the upper end of the wedge 44, two sealing lips 46 and 47 extend from the wedge to the sealing molding 43 and over the right hand leg of the channel member 37, respectively. Sealing lip 46 covers the opening between the wedge 44 and the sealing molding 43 resulting from the length of the protrusions 45 extending from the wedge, and thus provides a smooth surface from the wedge 44 to the sealing molding 43. The sealing lip 47, which extends down the outside surface of the right hand leg of the channel member 37, may conveniently be used to secure paneling 48, which may be either the headliner or the upholstery of the window side posts. The smooth surface on the end 41 of the leg 37 will avoid damage to the paneling 48.

It will be understood that the above described embodiments are merely exemplary and that those skilled in the art may make many variations and modifications without departing from the spirit and scope of the invention. All such modifications and variations are intended to be within the scope of the invention as defined in the appended claims.

We claim:

1. An arrangement for mounting a glass pane in a window frame of an automobile, including channel means on one side of the window frame defining a groove extending peripherally of the window frame and elastic sealing molding extending peripherally of the frame, and having a recess in a part thereof on the opposite side of the frame from said groove for sealingly receiving the glass pane and further having a retaining lip on the groove side of the frame, said retaining lip protruding into the groove and engaging one side wall thereof, wherein the improvement comprises:
    a. said retaining lip having a relaxed cross-sectional width less than the cross-sectional width of the groove; and
    b. a wedge member positioned within the groove in the space between the retaining lip and the side wall of the groove opposite said one wall, the wedge member having a cross-sectional width greater than the width of said space when the retaining lip is in a relaxed state, whereby upon insertion of the wedge member into said space the retaining lip is compressed between the wedge member and said one wall of the groove.

2. An arrangement according to claim 1, wherein the wedge member is made of an elastic material.

3. An arrangement according to claim 2, wherein the improvement further comprises:
    said opposite wall of the groove having an edge portion inclined inwardly toward said one wall and at least partly overlapping the wedge member when the wedge member is inserted into said space.

4. An arrangement according to claim 1, wherein the wedge member includes protrusions on at least one of the surfaces thereof adapted to engage said retaining lip or said opposite wall, thereby to enhance retention of the retaining lip within the groove.

5. An arrangement according to claim 1, wherein the outer end of the wedge member is oriented evenly with an adjacent visible surface of the sealing molding when the wedge member is inserted into said space.

6. An arrangement according to claim 1, wherein the improvement further comprises:
    the channel means comprising a separate peripherally extending member secured to the window frame.

7. An arrangement according to claim 6, wherein the separate member is generally U-shaped in cross-section, the legs thereof forming the walls of said groove and being oriented generally parallel to the pane of glass, the end of at least said leg nearer said frame being turned inwardly toward said other leg.

8. An arrangement according to claim 7, wherein the wedge member includes a lip which extends over the end of said other leg.

9. An arrangement according to claim 6, wherein the separate member is generally U-shaped in cross-section, the legs of the U-shaped member forming the walls of said groove and being oriented generally perpendicular to the pane of glass such that the groove opens away from the glass pane toward the interior of the automobile.

10. An arrangement according to claim 1, wherein said one wall of the groove is oriented generally perpendicular to the pane of glass and the groove defined by the channel means opens away from the pane of glass toward the interior of the automobile.

* * * * *